Patented Nov. 26, 1946

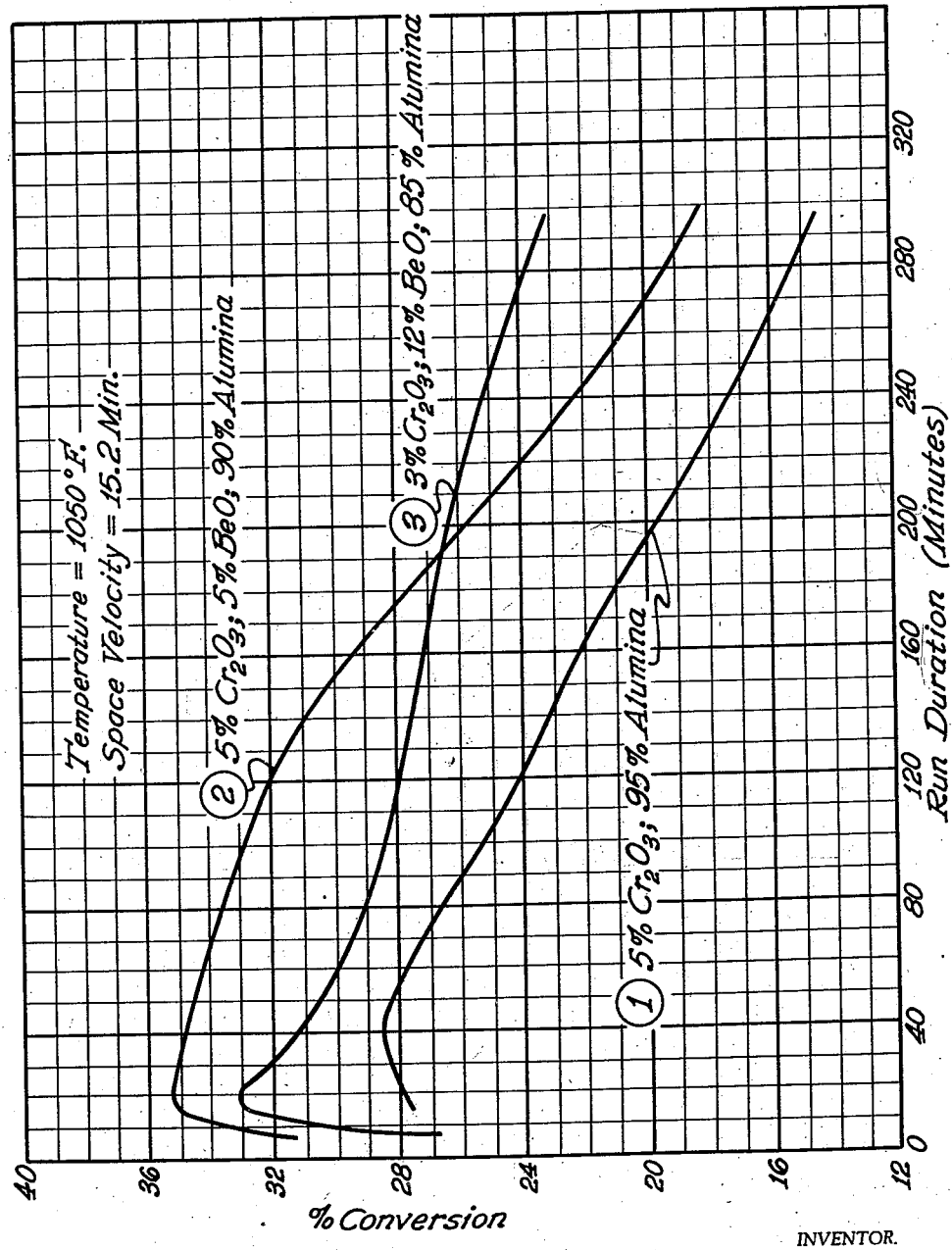

2,411,829

UNITED STATES PATENT OFFICE 2,411,829

CATALYSTS

Hal C. Huffman, Long Beach, Calif., assignor to Union Oil Company of California, Los Angeles, Calif., a corporation of California Application August 25, 1942, Serial No. 456,009

5 Claims. (Cl. 252—211.5)

This invention relates to catalysts and catalytic processes for the processing of various hydrocarbons. More particularly, the invention relates to the catalytic dehydrogenation of light or normally gaseous hydrocarbons such as propane, butane, isobutane and the like and of commercial naphthas and stocks boiling within the gasoline range to produce an improved type of motor fuel. This application is a continuation in part of my copending application Serial No. 382,735, filed March 11, 1941.

The principal objects of the invention are to provide an efficient catalyst which is comparatively easy to produce, has a long catalytic life, is not easily poisoned and at the same time causes an adequate high conversion of the saturated to unsaturated hydrocarbons. A more specific object of the invention is to provide a catalyst composition containing a promoter for the catalytic agent which permits the catalyst to effect a higher degree of dehydrogenation and for a longer period of time. Other and more specific objects of the invention will become apparent as the description thereof proceeds.

The catalytic dehydrogenation of hydrocarbons is a well known process. For this purpose, many catalytic materials have been employed with varying success. Among these catalysts are the metal oxides, chromates, sulfates, nitrates, chlorides and other suitable salts of chromium, molybdenum, cobalt, nickel, zinc, iron, lead, cadmium, vanadium, manganese, titanium, tantalum, tungsten, platinum, columbium, scandium, thorium, uranium, zirconium, tin, copper, etc. Many of these catalysts are effective when supported on such carriers as alumina, magnesium oxide, silica-alumina mixtures, zirconia, titania, thoria, etc. The oxides of chromium or molybdenum distended on alumina are preferred. For example, a catalyst composed of 5% chromium oxide and 95% alumina is capable of effecting as much as 28–29% conversion of normal butane to butylene at a temperature of 1050° F. at substantially atmospheric pressure and a space velocity of 15 to 17 per minute. My invention relates to an improvement in the above process for dehydrogenating hydrocarbons.

I have discovered that the presence in the catalyst of a small amount of beryllium compound, such as beryllia, not only increases the activity of the foregoing dehydrogenation catalysts to a large extent but maintains the catalytic life of these catalysts at a high level for a considerably longer time than in the case of using the same catalyst in the absence of the beryllium compound. I have found this to be particularly true in the case of chromium oxide or molybdenum oxide or other oxides of metals selected from the left-hand column of the sixth group of the periodic table distended on "activated alumina." A composition of 1 to 10% chromium oxide, 75 to 98% "activated alumina" and 1 to 15% beryllia has been found to be a particularly excellent catalyst for dehydrogenating hydrocarbon gases such as normal butane. Preferably, the amount of beryllia should be approximately 5% by weight based upon the beryllia, chromium oxide or other oxide and alumina ingredients, although the beryllia content may be lowered to about 2.5% without materially affecting the performance of the catalyst. The invention may perhaps be best understood by reference to the following examples which are merely illustrative of the invention and are not to be taken as limiting my invention.

Example 1

A chromium oxide-alumina catalyst was prepared as follows:

Commercial "activated alumina" (14–20 mesh) was impregnated with a water solution of chromium nitrate so that on drying at 400° F. followed by heating in a current of hydrogen at 950° F. a catalyst composition was produced comprising 5% chromium oxide and 95% alumina. In the above, chromic acid or ammonium dichromate may be used in the place of chromium nitrate.

This catalyst was then used to effect dehydrogenation of normal butane at a temperature of about 1050° F. at pressure of about atmospheric and at a space velocity of about 15.2 per minute.

As shown in curve No. 1, the conversion of normal butane to butylene was about 28% at the 20 minute point. The catalytic activity gradually tapered off until at the end of 300 minutes of operation, the conversion was about 14.5%. The conversion at the 150 minute point was around 22.5%.

Example 2

Another catalyst was prepared as follows:

Commercial "activated alumina" was impregnated with a water solution of beryllium nitrate followed by drying first at 400° F. then at 850° F. after which the dried material was treated with a water solution of chromium nitrate and dried as after the first impregnation. Reduction with hydrogen at 950° F. gave a catalyst composition comprising approximately 5% chromium oxide, 5% beryllia, and 90% alumina.

This catalyst was then used to dehydrogenate normal butane at a temperature of about 1050° F. at a space velocity of about 15.2 per minute, or in other words, under substantially the same conditions as in Example 1. As shown in curve No. 2, a conversion of about 35% occurs at the 20 minute point which gradually decreased to around 18% at the end of 300 minutes. At the 150 minute point the conversion was 30%.

Example 3

Another catalyst was prepared as follows:

Commercial "activated alumina" (14–20 mesh) was impregnated with a solution of beryllium nitrate and a solution of chromium nitrate in the manner of Example 2 so that on reduction with hydrogen at 950° F. a catalyst composition of 3% chromium oxide, 12% beryllia, and 85% alumina was obtained.

This catalyst was then used to dehydrogenate normal butane under the same conditions as in the above examples. As shown in curve No. 3, a conversion of about 33% was obtained at the 20 minute point and the conversion gradually decreased to 23% at the end of 300 minutes. At the 150 minute point the conversion was around 27.5–28%.

It will be noted from a comparison of curves 2 and 3, that while the catalyst used in Example 2 showed a higher initial conversion than that used in Example 3, the catalytic activity of the latter is maintained at a higher level to the end of the run. It will be noted also that the presence of beryllia during the reaction materially promotes the activity of the chromium oxide-alumina catalyst to such extent as to result in a conversion at a high level for a longer period of time. This effect is definitely beneficial since it permits a greater conversion for the same period of reaction time as compared with the unpromoted catalyst or permits the use of the catalyst for a longer period of time before regeneration is required.

The effect of the beryllia is apparently one of true promotion of the catalyst as distinguished from the use of the substance as a catalyst per se. Beryllia when used alone as a catalyst under the foregoing described conditions of operation showed no ability to catalyze the dehydrogenation of normal butane. A catalyst consisting of 20% beryllia and 90% alumina also showed no catalytic activity to dehydrogenate normal butane.

While the conversion has been illustrated using chromim oxide-alumina as the catalyst and beryllia as the promotor, it is within the spirit of my invention to use beryllia for the promotion of other dehydrogenation catalysts such as mentioned above. I prefer, however, to use those catalysts which have been distended on such supports as alumina, magnesium oxide, activated carbon and the like. Also, instead of using beryllia as the promoter, other beryllium compounds such as the sulfate or the nitrate may be used to promote the catalyzing effect of the dehydrogenation catalysts.

The catalyst composition should preferably be free from metallic halides, particularly metallic fluorides, such as sodium fluoride, since the presence of the metallic halides tends to flux the catalyst in such manner as to cause it to lose its activated structure. The amount of halides present in the catalyst should be less than 0.2% and preferably less than 0.001%. A suitable commercial "activated alumina" is one prepared and sold commercially by the Aluminum Ore Company of St. Louis, Missouri, under as grade $xF-1$. This alumina and chemically pure reagents dissolved in distilled water were used in the foregoing examples.

The catalysts are preferably prepared by adsorption or impregnation of pilled, pelleted, extruded or otherwise shaped alumina as well as from granular or powdered alumina. In order to distend the beryllia and the oxide of a metal selected from the left-hand column of the sixth group of the periodic table, it is preferable to employ an aqueous solution of a suitable salt of the metal. In the case of beryllia, $Be(NO_3)_2.3H_2O$ or $BeSO_4.4H_2O$ may be used and in the case of the chromium oxide, $CrO_3$, $(NH_4)_2CrO_7$ or $$Cr(NO_3)_2.9H_2O$$

may be employed. It is preferable to form the chromium sesquioxide on the alumina. These are impregnated in the alumina and then dried, preferably at two temperature levels. The primary drying is effected at a lower temperature of the order of 400–500° F. and the final drying is accomplished at a higher calcining temperature between approximately 750 and 1000° F. and even higher in those cases where the catalyst is employed at higher temperatures, with or without hydrogen or other reducing agent being present. The calcination or heating at such higher temperatures results in reducing the salt to the corresponding oxide. The impregnation may be carried out by immersing the alumina to be impregnated in a solution of known strength of the desired salts which is followed by sucking the impregnated material to near dryness such as occurs when placing the impregnated material in a Büchner funnel and connecting the bottom of the funnel to a source of vacuum. If desired, the volume of the impregnating solution or solutions may be adjusted so that practically all is adsorbed by the alumina.

It is preferable to distend first one of the oxides on the alumina and then the other as illustrated in Example 2, thus using separate solutions of the beryllium and chromium or other salts with drying and calcining between impregnations. The alumina is preferably impregnated with the beryllium salt followed by calcination to bring about an effective intimate combination of the beryllia and alumina before the catalytic material is applied. However, simultaneous deposition from a single water solution of the beryllium salt and the salt of the desired element of the left-hand column of the sixth group of the periodic table is satisfactory, particularly when an impregnating solution of beryllium and chromium or other metal nitrates is used. The drying and calcining is accomplished in the manner described above.

In some instances, it has been found that an already prepared catalyst consisting of an oxide of an element of the left-hand column of the sixth group of the periodic table and alumina may be improved by a simple impregnation with a beryllium salt such as the nitrate or sulfate followed by drying and calcining to decompose the salt of the oxide.

Another method for preparing the catalyst consists in mixing a powdered "activated alumina" with a gel composed of the precipitated hydrous oxides of beryllium and the catalytic material which is followed by extruding the material and drying. The dried worms may be used as such or they may be ground to a powder, mixed with a suitable organic lubricant, such as rosin, stearic acid or other solid fatty acids and then pilled or pelleted. The organic lubricant is removed by passing air through the pilled catalyst at 900–1500° F. If desired, the granular "activated alumina" may be mixed with a precipitated hydrous gel of beryllia and the mixture dried and calcined to yield a material which may be powdered, granuled or pilled followed by impregnation with the desired metal oxide producing salt of the left-hand column of the sixth group of the periodic table or the catalytic agent may be added to the wet mixture of "activated alumina" and precipitated hydrous oxide of beryllium and the mixture then dried and calcined.

If desired, the "activated alumina" may be diluted with 10 to 50% of clays or other fillers which thus lowers the cost of the finished catalyst. In some cases, the clay is useful as a binder in the catalytic composition.

Also, instead of using the catalyst for dehydrogenating normal butane, the catalyst may be used for dehydrogenating other normally gaseous hydrocarbons such as ethane, ethylene, propane, propylene, butylene, etc., and also normally liquid hydrocarbons such as hexane, heptane, octane, etc. In those cases where the catalysts are also useful for deforming or aromatization of gasoline in order to improve the knock rating of the gasoline, the presence of the beryllium compound will have beneficial effect upon the catalyzing effect of the catalysts employed in these operations. In other words, the term "dehydrogenation" as used herein is intended to include the dehydrogenation of not only normally gaseous hydrocarbons but also the dehydrogenation or aromatization of normally liquid hydrocarbons such as reforming of gasoline.

In the foregoing description and examples, all given percentages are by weight. The foregoing description of my invention is not to be considered as limiting since many variations may be made by those skilled in the art without departing from the scope of the claims or the spirit thereof.

I claim:

1. A catalyst consisting of approximately 1 to 15% beryllia, approximately 1 to 10% of an oxide of a metal selected from the left-hand column of the sixth group of the periodic table and the remainder an "activated alumina."

2. A catalyst according to claim 1 in which the oxide of the metal selected from the left-hand column of the sixth group of the periodic table is chromium oxide.

3. A catalyst according to claim 1 in which the oxide of the metal selected from the left-hand column of the sixth group of the periodic table is molybdenum oxide.

4. A catalyst consisting of approximately 5% beryllia, approximately 5% of an oxide of a metal selected from the left-hand column of the sixth group of the periodic table and the remainder a carrier.

5. A catalyst consisting of approximately 5% beryllia, approximately 5% of chromium oxide and the remainder an activated alumina carrier.

HAL C. HUFFMAN.